(12) United States Patent
Melton et al.

(10) Patent No.: US 10,279,893 B2
(45) Date of Patent: May 7, 2019

(54) SYSTEM AND METHOD FOR VALIDATING ROTORCRAFT POSITION COORDINATES

(71) Applicant: Bell Helicopter Textron Inc., Fort Worth, TX (US)

(72) Inventors: John Wesley Melton, Ft. Worth, TX (US); Stephanie Baynham, Tacoma Park, MD (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 85 days.

(21) Appl. No.: 15/435,033

(22) Filed: Feb. 16, 2017

(65) Prior Publication Data

US 2018/0229831 A1 Aug. 16, 2018

(51) Int. Cl.
| | |
|---|---|
| *G01C 23/00* | (2006.01) |
| *G05D 1/00* | (2006.01) |
| *G05D 3/00* | (2006.01) |
| *G06F 7/00* | (2006.01) |
| *G06F 17/00* | (2019.01) |
| *B64C 13/50* | (2006.01) |
| *G01S 19/13* | (2010.01) |
| *B64D 43/00* | (2006.01) |
| *G05D 1/10* | (2006.01) |
| *G01S 13/08* | (2006.01) |
| *G01D 7/00* | (2006.01) |
| *G01L 3/00* | (2006.01) |

(52) U.S. Cl.
CPC ............ *B64C 13/503* (2013.01); *B64D 43/00* (2013.01); *G01S 19/13* (2013.01); *G05D 1/0077* (2013.01); *G05D 1/102* (2013.01)

(58) Field of Classification Search
CPC ........ B64C 13/503; B64D 43/00; G01S 19/13
USPC .......................... 701/3; 342/125; 73/862.046
See application file for complete search history.

(56) References Cited

U.S. PATENT DOCUMENTS

| | | | |
|---|---|---|---|
| 5,757,677 | A | 5/1998 | Lennen |
| 6,111,536 | A * | 8/2000 | Richards ................. G01S 13/08 342/118 |
| 6,161,062 | A | 12/2000 | Sicre et al. |
| 2004/0245408 | A1 | 12/2004 | Peyrucain et al. |
| 2007/0113681 | A1 * | 5/2007 | Nishimura ............ G06F 3/0414 73/862.046 |
| 2010/0302099 | A1 | 12/2010 | Grossnickle et al. |

(Continued)

FOREIGN PATENT DOCUMENTS

| | | |
|---|---|---|
| EP | 2479588 A2 | 7/2012 |
| WO | 0014571 A1 | 3/2000 |

(Continued)

OTHER PUBLICATIONS

English Translation for WO2008062030.*

*Primary Examiner* — Mahmoud S Ismail

(74) *Attorney, Agent, or Firm* — Slater Matsil, LLP

(57) ABSTRACT

In accordance with an embodiment, a method of operating a rotorcraft includes receiving a first sensor value comprising a first coarse resolution portion and a first fine resolution portion, receiving a second sensor value comprising a second coarse resolution portion and a second fine resolution portion, and determining that the second coarse resolution portion corresponds with the second fine resolution portion when a difference between the second sensor value and the first sensor value is within a first threshold.

22 Claims, 7 Drawing Sheets

(56) References Cited

U.S. PATENT DOCUMENTS

| | | | |
|---|---|---|---|
| 2015/0309179 A1* | 10/2015 | Jantz | G01C 21/00 |
| | | | 701/468 |
| 2017/0131726 A1* | 5/2017 | Speyer | G05D 1/104 |
| 2018/0002011 A1* | 1/2018 | McCullough | B64C 29/0033 |
| 2018/0118336 A1* | 5/2018 | Drennan | B64C 37/02 |

FOREIGN PATENT DOCUMENTS

| | | | | |
|---|---|---|---|---|
| WO | WO-2008062030 A1 * | 5/2008 | | G01S 19/07 |
| WO | 2012050716 A1 | 4/2012 | | |
| WO | 2016002407 A1 | 1/2016 | | |

\* cited by examiner

SYSTEM AND METHOD FOR VALIDATING ROTORCRAFT POSITION COORDINATES

TECHNICAL FIELD

The present invention relates generally to a system and method for a flight control, and, in particular embodiments, to a system and method for validating rotorcraft position coordinates.

BACKGROUND

Fly-by-wire systems in aircraft, as opposed to mechanically controlled systems, use electronic signals to control the flight surfaces and engines in the aircraft. For example, instead of having the pilot controls mechanically linked to the control surfaces via a hydraulic system, the pilot controls are electronically linked to a flight computer, which, in turn, controls flight surface actuators via electronic signals. By further interfacing the flight computer to aircraft sensors, sophisticated control algorithms may be used to provide autopilot functionality, as well as to stabilize and control the aircraft.

While fly-by-wire systems have become commonplace in commercial and civilian fixed wing aircraft, their adoption among rotorcraft, such as helicopters, has been much slower due, in part, to the increased complexity of controlling and stabilizing a rotorcraft. However, by adopting fly-by-wire systems in helicopters, safer operation may be achieved in difficult flight environments such as low speed, low altitude, degraded visual environments and inclement weather. Another area in which fly-by-wire systems may benefit rotorcraft is in the reduction in pilot workload. By providing automated features such as stabilization in response to wind, control axis decoupling, position hold and heading hold functionality, the pilot is freed up to focus on the environment in which he or she flies.

SUMMARY

In accordance with an embodiment, a method of operating a rotorcraft includes receiving a first sensor value comprising a first coarse resolution portion and a first fine resolution portion, receiving a second sensor value comprising a second coarse resolution portion and a second fine resolution portion, and determining that the second coarse resolution portion corresponds with the second fine resolution portion when a difference between the second sensor value and the first sensor value is within a first threshold.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
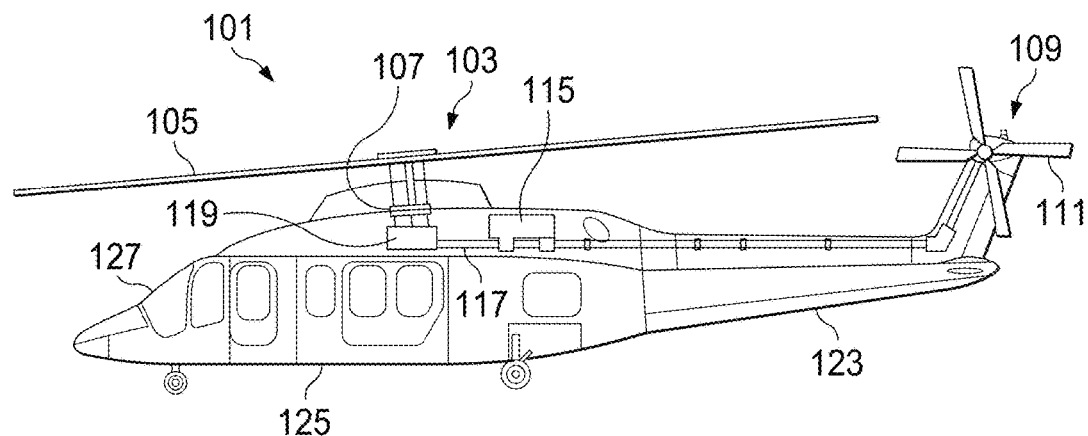
FIG. 1 illustrates an embodiment rotorcraft.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective causes increased power to the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures, provide for default or suggested control positioning, or the like.

FBW systems for rotorcraft must provide stable flight characteristics for FBW controlled flight parameters while permitting the pilot to override or adjust any suggested flight parameters suggested by the FBW system. Additionally, in providing enhanced control and automated functionality for rotorcraft flight, the FBW system must maintain an intuitive and easy to use flight control system for the pilot. Thus, the FBW system adjusts the pilot flight controls so that the controls are in a position associated with the relevant flight parameter. For example, the FBW system may adjust the collective stick to provide suggested or FBW controlled flight parameters, and which reflect a collective or power setting. Thus, when the pilot releases the collective stick and the FBW system provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system use the cyclic stick to, for example, adjust for turbulence, drift or other disturbance to the flight path, and may move the cyclic stick as the FBW system compensates the cyclic control. Thus, when the pilot grasps the cyclic stick to take control of flight from the FBW system, the cyclic stick is positioned to reflect the actual cyclic settings.

Embodiments of the present disclosure will be described with respect to preferred embodiments in a specific context, namely a system and method for validating rotorcraft position coordinates.

In various embodiments, a GPS receiver provides position information to a flight control system of the rotorcraft. This position information may be used, for example, by the flight control system to automatically hold a fixed position while hovering, to determine the velocity and heading of the rotorcraft, and to provide location and position information to the pilot. In order to provide fine resolution location information to the flight computer, the GPS receiver provides two 38 bit location values: one location value corresponding to a detected longitude and the other location word corresponding to a detected latitude. Each of these 38 bit location values are transmitted to the flight computer of the rotorcraft. However, because the bit width of the bus interface used to communicate between the various components of the fly-by-wire system is less than 38 bits, each 38 bit value is split into two words prior to being transmitted from the GPS receiver to the flight computer. One word is a coarse resolution location word that includes the most significant bits of the location word, and the other word is a fine resolution location word that includes the least significant bits of the location word. Furthermore, because the communication between the GPS receiver and the flight computer is asynchronous, there is a possibility that the coarse resolution location word and its associated fine resolution location word will lose synchronization with each other, thereby causing a coarse resolution location word to be paired with a non-corresponding fine resolution location word. When this happens, the determined GPS location potentially suffers an apparent discontinuity. Such a discontinuity may occur when the fine resolution cyclically word-wraps around and the least significant bit of the coarse resolution bit fails to increment or decrement in a corresponding manner. Such discontinuities in the determined GPS location may make it difficult for the fly-by-wire system to automatically hold the rotorcraft a fixed location because of fluxuation in the location error feedback used to stabilize the rotorcraft's position.

In embodiments of the present invention, a difference between successive GPS location words is monitored. If the difference between the successive location words does not exceed a threshold, the coarse resolution location word and the fine resolution location words are deemed to belong to the same location word and the location word is used by the flight control system. However, when the difference between the two successive GPS words exceeds the threshold, the most recent location word is discarded and the fly-by-wire system relies on the most recent location word that is deemed to be accurate.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the rotor system 103 and the anti-torque system through a main rotor transmission 119 and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, rotorcraft 101 could be configured as an unmanned vehicle, in which case cockpit 127 could be eliminated entirely in order to save space and cost.

Figure 2:
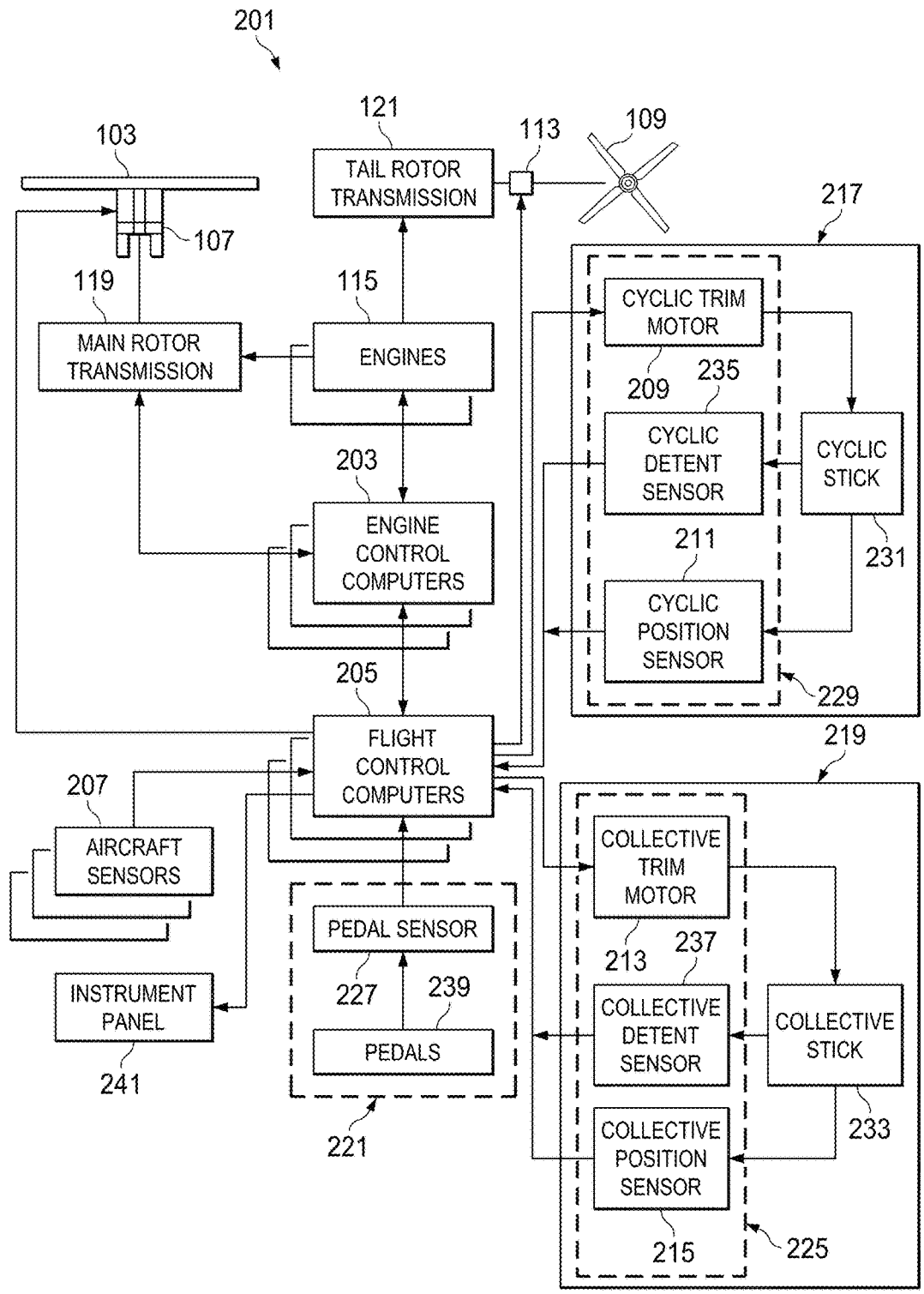
FIG. 2 illustrates a block diagram of an embodiment rotorcraft flight control system.

FIG. 2 illustrates a fly-by-wire flight control system 201 for a rotorcraft according to some embodiments. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades in or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes engine control computers (ECCUs) 203, flight control computers 205, and aircraft sensors 207, which collectively adjust the flight control devices.

The flight control system 201 has one or more flight control computers 205 (FCCs). In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cueing commands to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such a measured revolutions per minute (RPM) of the main rotor blades.

The aircraft sensors 207 are in communication with the FCCs 205. The aircraft sensors 207 may include sensors for measuring a variety of rotorcraft systems, flight parameters, environmental conditions and the like. For example, the aircraft sensors 207 may include sensors for measuring airspeed, altitude, attitude, position, orientation, temperature, airspeed, vertical speed, and the like. Other sensors 207 could include sensors relying upon data or signals originating external to the rotorcraft, such as a global positioning system (GPS) sensor, a VHF Omnidirectional Range sensor, Instrument Landing System (ILS), and the like.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic control stick 231. In some embodiments, the cyclic control stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic control stick 231. In some embodiments, the FCCs 205 determine a suggested cyclic stick position for the cyclic stick 231 according to one or more of the collective stick position, the pedal position, the speed, altitude and attitude of the rotorcraft, the engine revolutions per minute (RPM), engine temperature, main rotor RPM, engine torque or other rotorcraft system conditions or flight conditions. The suggested cyclic stick position is a position determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 206 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective control stick 233 in the collective control assembly 219. In some embodiments, the collective control stick 233 is a single control stick that moves along a single axis or with a lever type action. A collective position sensor 215 detects the position of the collective control stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective control stick 233. Similar to the determination of the suggested cyclic stick position, in some embodiments, the FCCs 205 determine a suggested collective stick position for the collective control stick 233 according to one or more of the cyclic stick position, the pedal position, the speed, altitude and attitude of the rotorcraft, the engine RPM, engine temperature, main rotor RPM, engine torque or other rotorcraft system conditions or flight conditions. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic and collective trim motors 209 and 213 may drive the cyclic stick 231 and collective stick 233, respectively, to suggested positions. The cyclic and collective trim motors 209 and 213 may drive the cyclic stick 231 and collective stick 233, respectively, to suggested positions, but this movement capability may also be used to provide tactile cueing to a pilot. The trim motors 209 and 213 may push the respective stick in a particular direction when the pilot is moving the stick to indicate a particular condition. Since the FBW system mechanically disconnects the stick from one or more flight control devices, a pilot may not feel a hard stop, vibration, or other tactile cue that would be inherent in a stick that is mechanically connected to a flight control assembly. In some embodiments, the FCCs 205 may cause the trim motors 209 and 213 to push against a pilot command so that the pilot feels a resistive force, or may command one or more friction devices to provide friction that is felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is holding the cyclic stick 231, while the collective control assembly 219 has a collective detent sensor 237 that determines whether the pilot is holding the collective stick 233. These detent sensors 235, 237 detect motion and/or position of the respective control stick that is caused by pilot input, as opposed to motion and/or position caused by commands from the FCCs 205, rotorcraft vibration, and the like and provide feedback signals indicative of such to the FCCs. When the FCCs 205 detect that a pilot has control of, or is manipulating, a particular control, the FCCs 205 may determine that stick to be out-of-detent (OOD). Likewise, the FCCs may determine that the stick is in-detent (ID) when the signals from the detent sensors indicate to the FCCs 205 that the pilot has released a particular stick. The FCCs 205 may provide different default control or automated commands to one or more flight systems based on the detent status of a particular stick or pilot control.

Figure 3:
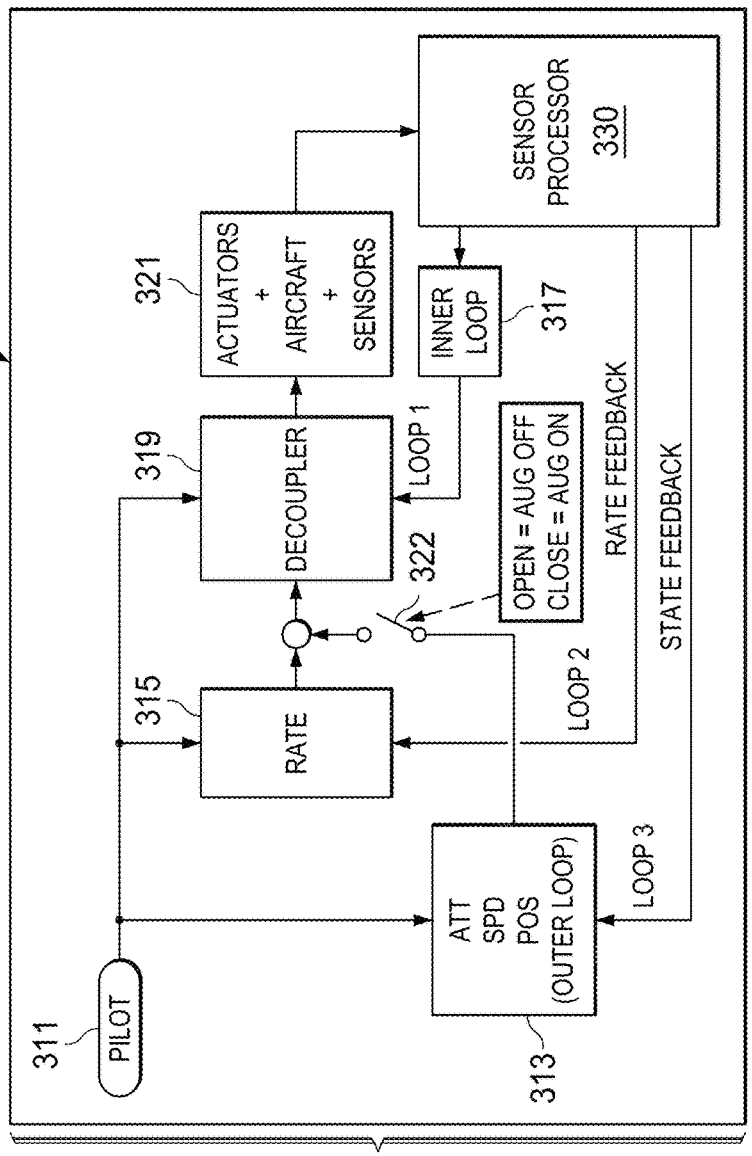
FIG. 3 illustrates a block diagram of an embodiment flight control system.
Figure 3:
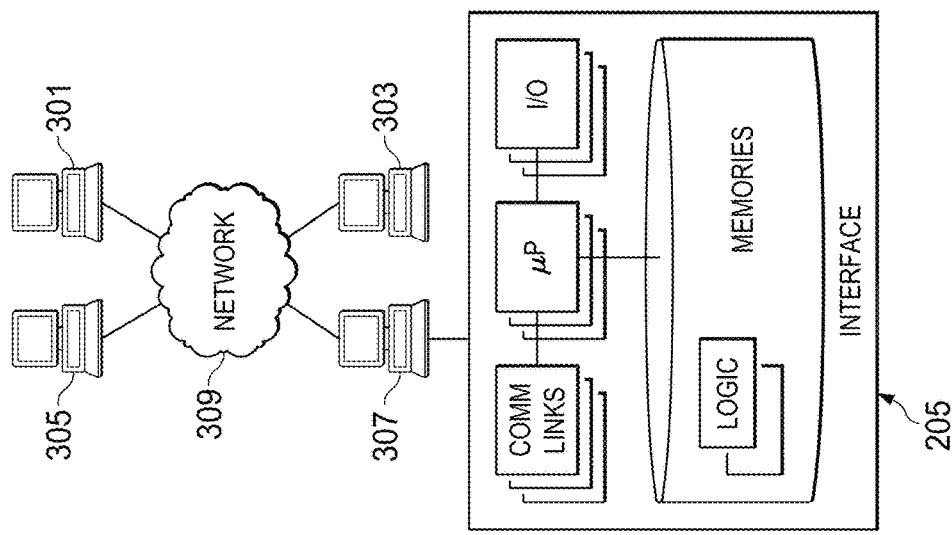

Moving now to the operational aspects of flight control system 201, FIG. 3 illustrates in a highly schematic fashion, a manner in which flight control system 201 may implement FBW functions as a series of inter-related feedback loops running certain control laws. FIG. 3 representatively illustrates a three-loop flight control system 201 according to an embodiment. In some embodiments, elements of the three-loop flight control system 201 may be implemented at least partially by FCCs 205. As shown in FIG. 3, however, all, some, or none of the components (301, 303, 305, 307) of three-loop flight control system 201 could be located external or remote from the rotorcraft 100 and communicate to on-board devices through a network connection 309.

The three-loop flight control system 201 of FIG. 3 has a pilot input 311, an outer loop 313, a rate (middle) loop 315, an inner loop 317, a decoupler 319, and aircraft equipment 321 (corresponding, e.g., to flight control devices such as swashplate 107, tail rotor transmission 212, etc., to actuators (not shown) driving the flight control devices, to sensors such as aircraft sensors 207, position sensors 211, 215, detent sensors 235, 237, etc., and the like).

In the example of FIG. 3, a three-loop design separates the inner stabilization and rate feedback loops from outer guidance and tracking loops. The control law structure primarily assigns the overall stabilization task and related tasks of reducing pilot workload to inner loop 317. Next, middle loop 315 provides rate augmentation. Outer loop 313 focuses on guidance and tracking tasks. Since inner loop 317 and rate loop 315 provide most of the stabilization, less control effort is required at the outer loop level. As representatively illustrated in FIG. 3, a switch 322 may be provided to turn outer loop flight augmentation on and off, as the tasks of outer loop 313 are not necessary for flight stabilization.

In some embodiments, the inner loop 317 and rate loop 315 include a set of gains and filters applied to roll/pitch/yaw 3-axis rate gyro and acceleration feedback sensors. Both the inner loop and rate loop may stay active, independent of various outer loop hold modes. Outer loop 313 may include cascaded layers of loops, including an attitude loop, a speed loop, a position loop, a vertical speed loop, an altitude loop, and a heading loop. In accordance with some embodiments, the control laws running in the illustrated loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain. In some embodiments, data produced by sensors within aircraft equipment 321 are conditioned by sensor processing block 330. Sensor processing block may reformat and rescale data to make the sensor data compatible with flight control algorithms, provide dynamic pre-filtering of the sensor signals and perform coordinate transformations of GPS location data from Earth axis coordinates to rotorcraft body coordinates.

Figure 4A:
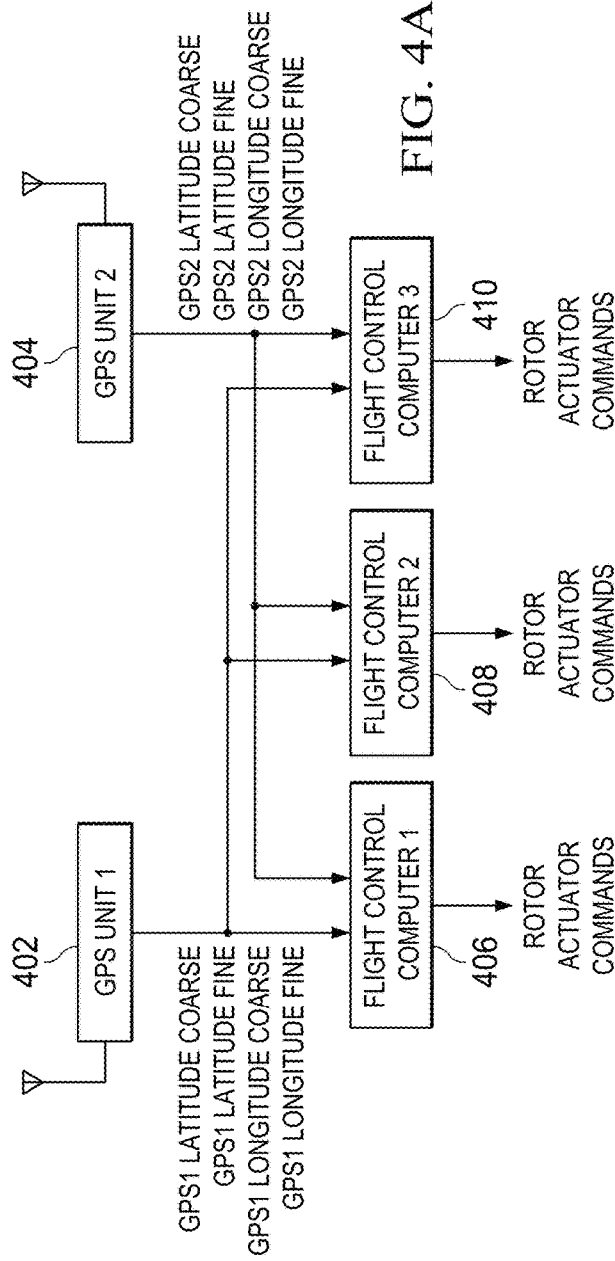
FIG. 4a illustrates a block diagram showing how redundant GPS units interface with redundant flight control computers.

As mentioned above, GPS sensors on board the rotorcraft provide location and velocity to the rotorcraft to the flight control system. This position and velocity information may be used as position and velocity feedback by the outer loop of flight control system 201 to automatically guide the rotorcraft at a fixed heading and fixed speed or to control the position of the rotorcraft to remain in a fixed position. In some embodiments, redundant GPS units and flight control computers are used in order to guarantee this outer loop functionality in the case of failures in one or more units. FIG. 4a illustrates a block diagram illustrating how double redundant GPS units 402 and 404 are interfaced with triple redundant flight control computers 406, 408 and 410. It should be understood that the use of double redundancy for GPS units 402 and 404 and triple redundancy to flight control computers 406, 408 and 410 are just one example of system redundancy for a rotorcraft. In some embodiments, both GPS units 402 and 404 operate simultaneously, however, the flight control computers may rely on only one of the GPS units 402 and 404 for position data. The validity of the data provided by GPS units 402 and 404 may be monitored to detect failures in GPS units 402 and 404. If one of GPS units 402 and 404 fail, then flight control computers 406, 408 and 410 receive position data from the other one of GPS units 402 and 404 that has not failed. In alternative embodiments, other degrees of redundancy are possible for the GPS units and flight control computer.

Each of GPS units 402 and 404 derive a location of the rotorcraft based on received transmissions from global positioning satellites. From these received transmissions, each GPS unit 402 and 404 produces two location values. One location value specifies the latitude in degrees, and the other location value specifies the longitude in degrees. Since GPS units 402 and 404 are interfaced to flight control computers 406, 408 and 410 via a bus interface that contains less than 38 bits per transmission word, each location value is divided into two separate transmission words: a coarse word representing the most significant bits of the location value, and a fine word representing the least significant bits of location value. Each of these coarse resolution position words and fine resolution position words corresponding to the latitude and longitude detected by GPS units 402 404 are transmitted to flight computers 406, 408 and 410 via the bus. In one embodiment, the bus between the GPS units 402 and 404 and the flight computers 406, 408 and 410 operate according to the ARINC-429 avionics data bus standard. Alternatively, other bus standards could be used according to the particular system and its specifications.

Figure 4B:
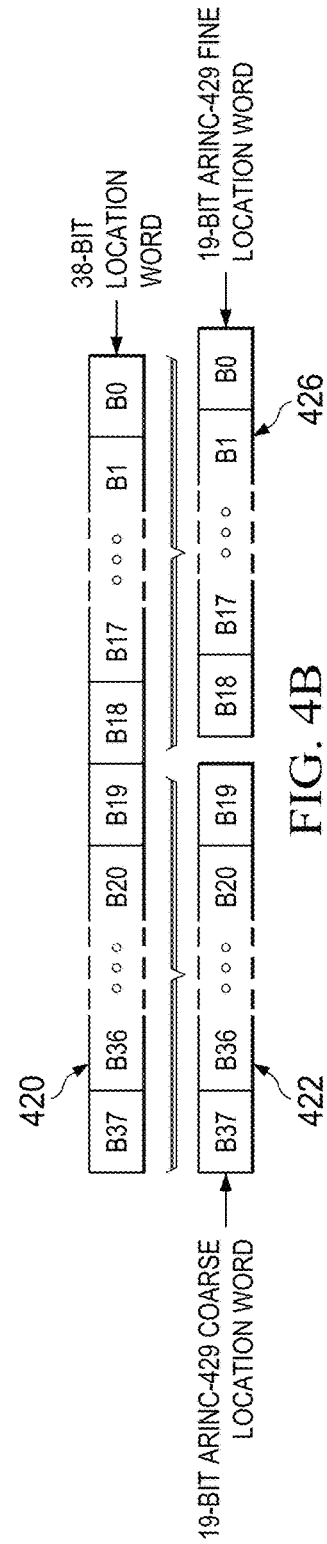
FIG. 4b illustrates how a GPS position word is partitioned between a coarse resolution position word and a fine resolution position word.

In an embodiment, the bit location words generated by GPS sensors 402 and 404 are split into two words having 19 bits each. As shown in FIG. 4b, the 38 bit location value 420 includes bits B37 to B0. This value is split into coarse word 422 that includes 19 MSBs B37 to B19 and fine word 426 that includes 19 LSBs B18 to B0, which are included within the payload of a 32-bit ARINC-429 bus word. In addition, to the 19-bit portion of the GPS coordinate, the ARINC-429 bus word may include an 8-bit label, a sign bit, two status bit and a parity bit. It should be understood that in alternative embodiments of the present invention, other bit widths and bit allocations may be used.

During operation, GPS unit 402 and/or GPS unit 404 transmit coarse resolution position word 422 and fine resolution position word 426 to flight control computers 406, 408 and 410. In embodiments where GPS units 402 and 404 are separate from flight control computers 406 408 and 410, the transmission of the location information is asynchronous to the operation of flight control computers 406, 408 and 410. As such, the pairing between coarse resolution position word 422 and its associated fine resolution position word 426 may become dissociated from each other. As a result, flight computer 406 408 and 410 may process mismatched coarse resolution position word 422 and fine resolution position word 426 pairs. In some circumstances, the mismatched position word pair causes flight control computers 406, 408 or 410 to erroneously sense a discontinuity in the physical location of the rotorcraft. Such discontinuities may adversely affect the ability of the flight control system of the rotorcraft to automatically maintain a fixed location while the rotorcraft is hovering. In embodiments of the present invention, successive location words are evaluated for discontinuities in order to determine whether or not coarse resolution position word 422 adequately match fine resolution position word 426. When the flight control system 201 determines that coarse resolution position word 422 and fine resolution position word 426 do not match each other, the incoming GPS position word is discarded and a previously received location is substituted by the flight control system 201 to determine the present location of the rotorcraft. In some embodiments of the present invention, the determination of whether or not coarse resolution position word 422 and fine resolution position word 426 are adequately matched is performed by flight control software that is executed on flight control computers 406, 408 and 410.

Figure 5:
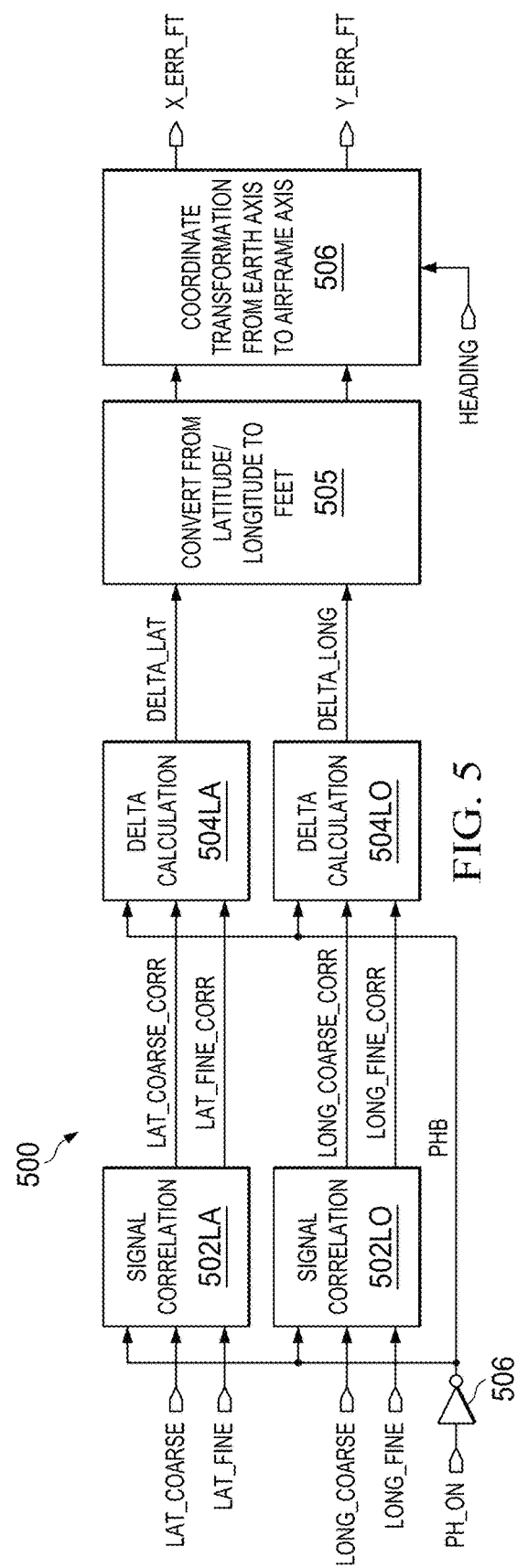
FIG. 5 illustrates an embodiment GPS signal management system; further embodiment flight control system.

FIG. 5 illustrates GPS signal management system 500 according to an embodiment of the present invention. As shown, GPS signal management system 500 produces position error signals referenced to the body axis of the rotorcraft from the 19 bit coarse and fine latitude and longitude location words received from GPS units 402 or 404. In some embodiments, GPS signal management system 500 is included within sensor processing block 330 of flight control system 201 and may be executed, for example, on flight control computers 406, 408 and 410. Signal correlation blocks 502 determine whether or not the coarse and fine resolution position words received from GPS units 402 or 404 are adequately matched.

Latitude signal correlation block 502LA receives latitude coarse resolution position word LAT_COARSE and latitude fine resolution position word LAT_FINE, and outputs corrected latitude coarse resolution position word LAT_COARSE_CORR and corrected latitude fine resolution position word LAT_FINE_CORR. In an embodiment, latitude signal correlation block 502LA sets corrected latitude coarse resolution position word LAT_COARSE_CORR to be equal to received latitude coarse resolution position word LAT_COARSE and sets latitude fine resolution position word LAT_FINE_CORR to be equal to received latitude fine resolution position word LAT_FINE when the received coarse and fine resolution position words LAT_COARSE and LAT_FINE are estimated to be from the same GPS measurement. Otherwise, corrected latitude coarse resolution position word LAT_COARSE_CORR and corrected latitude fine resolution position word LAT_FINE_CORR are assigned to their previous values.

Similarly, longitude signal correlation block 502LO receives longitude coarse resolution position word LONG_COARSE and longitude fine resolution position word LONG_FINE, and outputs corrected latitude coarse resolution position word LONG_COARSE_CORR and corrected longitude fine resolution position word LONG_FINE_CORR. Longitude signal correlation block 502LO sets corrected longitude coarse resolution position word LONG_COARSE_CORR to be equal to received longitude coarse resolution position word LONG_COARSE and sets longitude fine resolution position word LONG_FINE_CORR to be equal to received longitude fine resolution position word LONG_FINE when the received coarse and fine resolution position words LONG_COARSE and LONG_FINE are estimated to be from the same GPS measurement. Otherwise, corrected longitude coarse resolution position word LONG_COARSE_CORR and corrected longitude fine resolution position word LONG_FINE_CORR are assigned to their previous values.

In an embodiment, position hold signal PH_ON is asserted when flight control system 201 is configured to cause the rotorcraft to hover over a fixed point. Thus, when PH_ON is first asserted, the currently received position coordinates become reference coordinates and the output error position coordinates X_ERR_FT and Y_ERR_FT are configured to be zero when the rotorcraft hovers above the current reference coordinates. As the rotorcraft moves away from the reference coordinate, output error position coordinates X_ERR_FT and Y_ERR_FT increase accordingly. In some embodiments, output error position coordinates X_ERR_FT and Y_ERR_FT are used by outer loop 313 to provide the appropriate control signals to maintain the position of the rotorcraft over the reference coordinate.

When position hold signal PH_ON is asserted, signal correlation blocks 502LA and 502LO determine whether or not the coarse and fine location words received from GPS units 402 or 404 are adequately matched. When hold signal PH_ON is not asserted, position words LAT_COARSE, LAT_FINE, LONG_COARSE, and LONG_FINE are passed directly to LAT_COARSE_CORR, LAT_FINE_CORR, LONG_COARSE_CORR, and LONG_FINE_CORR. In order words, the coarse and fine resolution position values are passed through signal correlation blocks 502LA and 502LO.

Delta calculation blocks 504LA and 504LO are configured to save a reference coordinate when hold signal PH_ON is first asserted and produce a latitude difference coordinate DELTA_LAT and longitude difference coordinate DELTA_LONG that represents a difference between the received coordinate and the held coordinate. Coordinate conversion block 505 converts coordinates coordinate DELTA_LAT and longitude difference coordinate DELTA_LONG, which are in units of degrees, to coordinates having units of feet having a basis in the Earth axis. Coordinate transformation block 506 converts these Earth axis coordinates into airframe axis long heading position error X_ERR_FT and cross heading position error Y_ERR_FT, which are in units of feet based on a received heading value HEADING that is generated, for example by a magnetic heading returned by an attitude/heading reference system (AHRS) that includes, for example, accelerometers, gyroscopes, magnetometers, and other systems that determine the attitude, velocity and acceleration of the rotorcraft on its various axes. This magnetic heading may be verified by comparing it to a GPS heading. The values of output error position coordinates X_ERR_FT and Y_ERR_FT are set to zero when PH_ON is not asserted. In an embodiment, the body axis is orthogonal to the long heading axis, and the long heading position error X_ERR_FT and cross heading position error Y_ERR_FT represent relative distances with respect to the reference coordinate.

Figure 6:
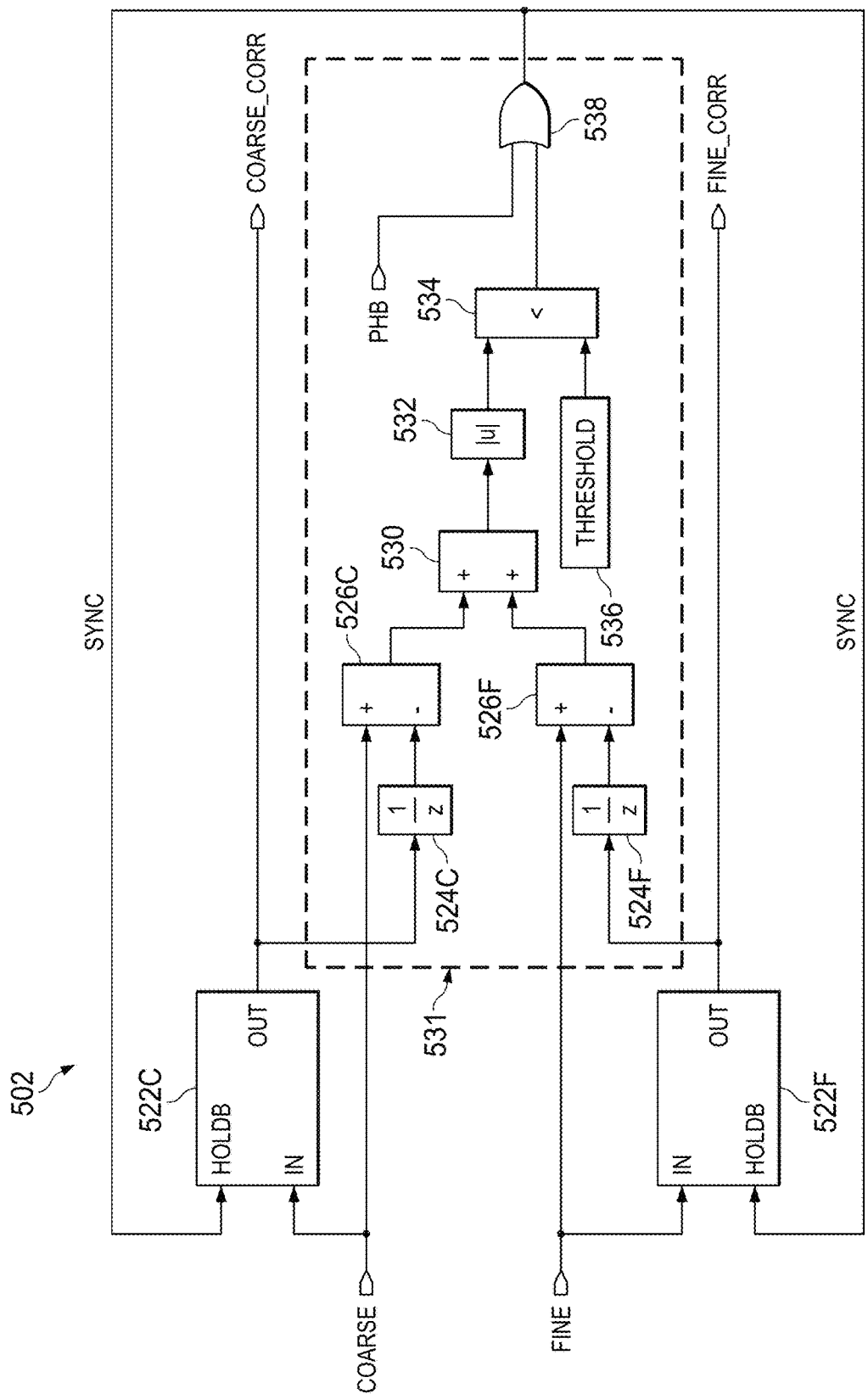
FIG. 6 illustrates an embodiment signal correlation block of the GPS signal management system.

FIG. 6 illustrates a signal correlation block 502 according to an embodiment of the invention. Signal correlation block 502 may be used, for example, as the signal correlation blocks 502C and 502F of GPS signal management system 500 shown in FIG. 5. As shown, signal correlation block 502 includes correlation logic block 531 that estimates whether or not the present values of coarse resolution position word COARSE and fine resolution position word FINE are from the same GPS sample. Coarse resolution position word COARSE and fine resolution position word FINE may also be referred to as a coarse resolution position coordinate COARSE and a fine resolution position coordinate, respectively. Signal correlation block 502 further includes a pair of transparent latches 522C and 522F that either allows the values of coarse and fine resolution position words COARSE and FINE to pass directly to output variables COARSE_CORR and FINE_CORR, or holds the output values of COARSE_CORR and FINE_CORR. When correlation logic block 531 estimates that coarse resolution position word COARSE and fine resolution position word FINE are from the same GPS sample, signal SYNC is asserted, which causes latches 522C and 522F to be transparent, thereby allowing the values of coarse and fine resolution position words COARSE and FINE to pass directly to output variables COARSE_CORR and FINE_CORR. On the other hand, when correlation logic block 531 estimates that coarse resolution position word COARSE and fine resolution position word FINE are from different GPS samples, signal SYNC is de-asserted, which causes latches 522C and 522F to hold their previous values. This effectively discards the mismatched coarse resolution position word COARSE and fine resolution position word FINE and prevents them from propagating any further through the signal path of signal correlation block 502.

Correlation logic block 531 estimates whether or not coarse and fine resolution position words COARSE and FINE are associated with the same GPS sample by calculating a difference between successive samples and comparing the difference to a threshold. As shown, unit delay block 524C applies a one sample delay to corrected coarse resolution position word COARSE_CORR and subtraction block 526C subtracts the delayed corrected coarse resolution position word COARSE_CORR from the input coarse resolution position word COARSE, which effectively determines a difference between two successive coarse resolution position values. Similarly, unit delay block 524F applies a one sample delay to corrected fine resolution position word FINE_CORR and subtraction block 526F subtracts the delayed corrected fine resolution position word FINE_CORR from the input fine resolution position word FINE, which effectively determines a difference between two successive fine resolution position values. The difference values produced by subtractors 526C and 526F are summed together using adder 530, an absolute value of the sum is determined using absolute value block 532, and the absolute value of the sum is compared with a threshold 536 via comparison block 534. When the absolute value of the sum is less than threshold 536, signal SYNC is asserted and latches 522C and 522F are placed in their transparent state, which allows signals COARSE and FINE to pass through to signals COARSE_CORR and FINE_CORR.

In various embodiment, threshold 536 is based on a maximum expected change in position for a given maximum velocity of the rotorcraft for a given flight control computer computation cycle. In one embodiment, threshold 536 is set to $3.5 \times 10^{-5}$ degrees, which is a maximum change in position expected when the rotorcraft is traveling 12 feet in a period of 20 ms or at 355 knots. Any change in position in excess of $3.5 \times 10^{-5}$ degrees in 20 ms is thus attributed to artifacts in the GPS position caused by a mismatch of coarse and fine resolution position words. It should be understood that in alternative embodiments of the present invention, a different thresholds may be used depending on the particular type of rotorcraft, its maximum expected velocity and the length of time step or length of the evaluation cycle used by the flight control system.

In some embodiments, OR gate 538 produces a logic OR of the output of comparison block 534 with active low position hold signal PHB. Thus, when the position hold mode is off, output SYNC of OR gate 538 is high, which allows coarse and fine resolution position signals COARSE and FINE to pass through to signals COARSE_CORR and FINE_CORR.

Figure 7:
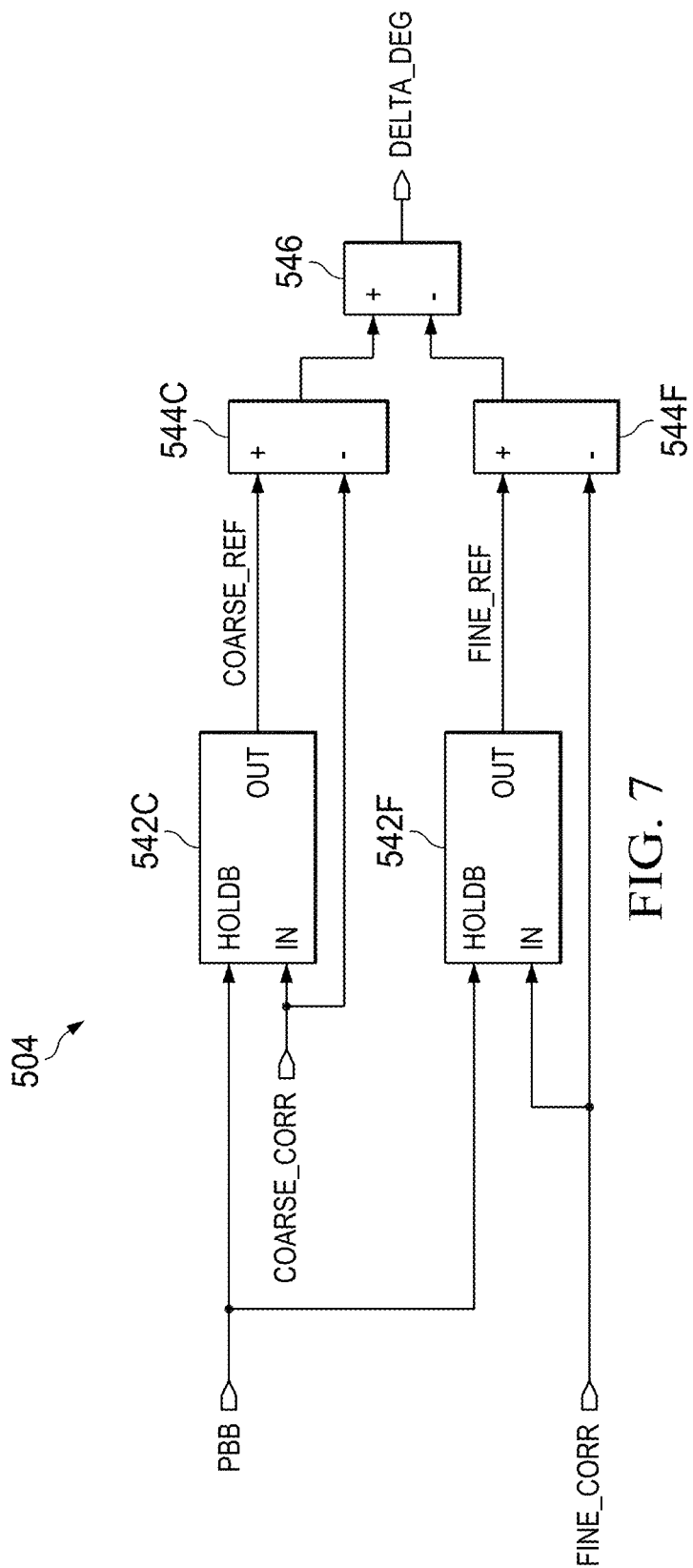
FIG. 7 illustrates an embodiment position error calculation block of the GPS signal management system.

FIG. 7 illustrates delta calculation block 504 according to an embodiment of the invention. Delta calculation block 504 may be used to implement delta calculation blocks 504LA and 504LO of GPS signal management system 500 shown in FIG. 5. As shown, delta calculation block 504 includes transparent latches 542C and 542F that hold a coarse and fine resolution reference values COARSE_REF and FINE_REF when the position hold mode is activated (e.g., when signal PBB is low). Subtraction block 544C subtracts corrected coarse position word COARSE_CORR from coarse reference value COARSE_REF and subtraction block 544F subtracts corrected fine position word COARSE_FINE from fine reference value FINE_REF. Adder 546 adds the differences produced by subtraction blocks 544C and 544F to produce position difference coordinate DELTA_DEG, which represents the position difference in degrees between the current corrected position and the reference position.

In various embodiments, latches 522C and 522F, unit delay blocks 524C and 524F, subtractors 526C and 526F, adder 530, absolute value block 532, comparison block 534, OR gate 538 and threshold block 536 shown in FIG. 6 and latches 542C and 542F, subtraction block 544C and 544F and adder 546 shown in FIG. 7 may be implemented in software that is stored in memory and is executed by a processor. Alternatively, these elements may be implemented using hardwired or programmable logic that includes logic gates and registers that implement the logical blocks of signal correlation block 502 and delta calculation block 504. In further embodiments, signal correlation block 502 and delta calculation block 504 may be implemented using other circuits, systems, logic and/or algorithm that are functionally equivalent to the embodiments depicted in FIGS. 6 and 7.

Figure 8:
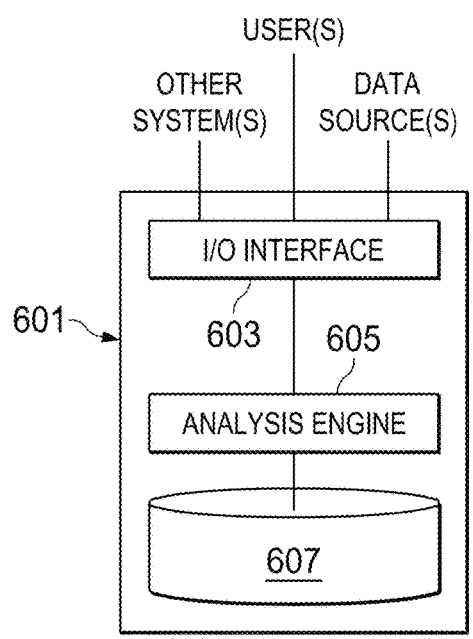
FIG. 8 illustrates a computer system that may be used to implement embodiment control algorithms.

FIG. 8 illustrates a computer system 601. The computer system 601 can be configured for performing one or more functions with regard to the operation of the flight control system 201 including GPS signal management system 500, as described herein. Further, any processing and analysis can be partly or fully performed by the computer system 601. The computer system 601 can be partly or fully integrated with other aircraft computer systems or can be partly or fully removed from the rotorcraft.

The computer system 601 can include an input/output (I/O) interface 603, an analysis engine 605, and a database 607. Alternative embodiments can combine or distribute the I/O interface 603, the analysis engine 605, and the database 607, as desired. Embodiments of the computer system 601 may include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 603 can provide a communication link between external users, systems, and data sources and components of the computer system 601. The I/O interface 603 can be configured for allowing one or more users to input information to the computer system 601 via any known input device. Examples can include a keyboard, mouse, touch screen, and/or any other desired input device. The I/O interface 603 can be configured for allowing one or more users to receive information output from the computer system 601 via any known output device. Examples can include a display monitor, a printer, cockpit display, and/or any other desired output device. The I/O interface 603 can be configured for allowing other systems to communicate with the computer system 601. For example, the I/O interface 603 can allow one or more remote computer(s) to access information, input information, and/or remotely instruct the computer system 601 to perform one or more of the tasks described herein. The I/O interface 603 can be configured for allowing communication with one or more remote data sources. For example, the I/O interface 603 can allow one or more remote data source(s) to access information, input information, and/or remotely instruct the computer system 601 to perform one or more of the tasks described herein.

The database 607 provides persistent data storage for the computer system 601. Although the term "database" is primarily used, a memory or other suitable data storage arrangement may provide the functionality of the database 607. In alternative embodiments, the database 607 can be integral to or separate from the computer system 601 and can operate on one or more computers. The database 607 preferably provides non-volatile data storage for any information suitable to support the operation of the flight control system 201, including various types of data discussed further herein. The analysis engine 605 can include various combinations of one or more processors, memories, and software components.

Embodiments of the present invention are summarized here. Other embodiments can also be understood form the entirety of the specification and the claims filed herein. One general aspect includes a method of operating a rotorcraft that includes receiving a first sensor value including a first coarse resolution portion and a first fine resolution portion; receiving a second sensor value including a second coarse resolution portion and a second fine resolution portion; and determining that the second coarse resolution portion corresponds with the second fine resolution portion when a difference between the second sensor value and the first sensor value is within a first threshold.

Implementations may include one or more of the following features. The method where the first sensor value includes a first position coordinate of the rotorcraft; the first coarse resolution portion includes a first coarse resolution position word; the first fine resolution portion includes a first fine resolution position word; the second sensor value includes a second position coordinate of the rotorcraft; the second coarse resolution portion includes a second coarse resolution position word; and the second fine resolution portion includes a second fine resolution position word. The method may further include holding the first position coordinate when the second coarse resolution position word does not correspond with the second fine resolution position word. Holding the first position coordinate may include latching the first coarse resolution position word and latching the first fine resolution position word, where the first coarse resolution position word and the first fine resolution position word are evaluated as the first coarse resolution position word and the first fine resolution position word at a next evaluation cycle.

In some embodiments, determining includes: calculating a difference between the second coarse resolution position word and the first coarse resolution position word to form a first difference; calculating a difference between the second fine resolution position word and the second fine resolution position word to form a second difference; summing the first difference with the second difference to form a third difference; determining an absolute value of the third difference; and comparing the absolute value of the third difference to the first threshold. The first threshold may be based on a velocity of the rotorcraft.

In an embodiment, receiving the first position coordinate and the second position coordinate are received from a global positioning system (GPS) receiver. The first position coordinate and the second position coordinate may each include a latitude value and a longitude value. The method may further include: subtracting the second coarse resolution position word from a reference coordinate to form a position error for the latitude value and the longitude value; and converting the position error for the latitude value and the longitude value to a relative distance value in a first direction and a relative distance value in a second direction orthogonal to the first direction.

Another general aspect includes a flight control system for a rotorcraft including: a processor and a non-transitory computer readable storage medium with an executable program stored thereon, the executable program including instructions for: asynchronously receiving position coordinates of a rotorcraft from a position sensor, where each received position coordinate including a coarse resolution position coordinate and a fine resolution position coordinate; and determining whether the coarse resolution position coordinates and the fine resolution position coordinate of the received position coordinates correspond with each other, where determining includes calculating a difference between a presently received position coordinate and a previously received position coordinate, and comparing the calculated difference to a threshold.

Implementations may include one or more of the following features. The flight control system where each position coordinate includes a latitude coordinate and a longitude coordinate. In some embodiments, the threshold may be $3.5 \times 10^{-5}$ degrees, however, other threshold may be used. The threshold may be based on a velocity of the rotorcraft. Determining whether the coarse resolution position coordinate and the fine resolution position coordinate of the received position coordinates correspond with each other may include independently determining whether a coarse resolution latitude of the latitude coordinate corresponds with a fine resolution latitude of the latitude coordinate and whether a coarse resolution longitude coordinate corresponds with a fine resolution longitude coordinate of the longitude coordinate.

The executable program may further include instructions for: determining a difference between the received position coordinate and a reference coordinate to form a delta latitude coordinate and a delta longitude coordinate; and performing a coordinate transformation on the delta latitude coordinate and a delta longitude coordinate to produce a delta x coordinate representing a distance in an x direction and a delta y coordinate representing a distance in a y direction perpendicular to the x direction. In some embodiments, the executable program further includes instructions for discarding the presently received position coordinate when the calculated difference is greater than the threshold, discarding including using the previously received position coordinate in place of the presently received position coordinate.

In some embodiments, the flight control system where the position sensor includes at least one global positioning system (GPS) receiver. Asynchronously receiving the position coordinates may include asynchronously receiving the position coordinates via an ARINC-429 bus.

A further general aspect includes a rotorcraft including: a body; a power train coupled to the body and including a power source and a drive shaft coupled to the power source; a main rotor system coupled to the power train and including a plurality of main rotor blades; and a GPS receiver system configured sense a physical position and produce position coordinates based on the sensed physical position. Each position coordinate includes a latitude coordinate split into a coarse resolution latitude coordinate including the most significant bits of the latitude coordinate and a fine resolution latitude coordinate including the least significant bits of the latitude coordinate, and a longitude coordinate split into a coarse resolution longitude coordinate including the most significant bits of the longitude coordinate and a fine resolution longitude coordinate including the least significant bits of the longitude coordinate. The rotorcraft also includes a flight control system operable to change at least one operating condition of the main rotor system; a pilot control assembly configured to receive commands from a pilot, where the flight control system is a fly-by-wire flight control system in electrical communication with the pilot control assembly; and a flight control computer in electrical communication between the flight control system, the GPS receiver system, and the pilot control assembly. The flight control computer is configured to asynchronously receive the position coordinates from the GPS receiver system via a bus, determine whether the coarse resolution latitude coordinate corresponds with the fine resolution latitude coordinate by comparing a difference between the latitude coordinate and a previously received latitude coordinate to a first threshold, and determine whether the coarse resolution longitude coordinate corresponds with the fine resolution longitude coordinate by comparing a difference between the longitude coordinate and a previously received longitude coordinate to a second threshold.

Implementations may include one or more of the following features. The rotorcraft where the first threshold and the second threshold is 3.5×10-5 degrees. In some embodiments, the rotorcraft where: the bus includes an ARINC-429 bus; and the coarse resolution latitude coordinate, the fine resolution latitude coordinate, the coarse resolution longitude coordinate, and the fine resolution longitude coordinate each include 19 bits.

Advantages of embodiments include the ability for a rotorcraft to smoothly control a fixed position in a system in which position feedback values are partitioned into multiple words and asynchronously transmitted.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A flight control system for a rotorcraft comprising:
a processor and a non-transitory computer readable storage medium with an executable program stored thereon, the executable program including instructions for:
asynchronously receiving position coordinates of a rotorcraft from a position sensor, each received position coordinate comprising a coarse resolution position coordinate and a fine resolution position coordinate; and
determining whether the coarse resolution position coordinates and the fine resolution position coordinate of the received position coordinates correspond with each other, determining comprising calculating a difference between a presently received position coordinate and a previously received position coordinate, and comparing the calculated difference to a threshold, wherein the threshold is based on a velocity of the rotorcraft.

2. The flight control system of claim 1, wherein each position coordinate comprises a latitude coordinate and a longitude coordinate.

3. The flight control system of claim 2, wherein the threshold is 3.5×10-5 degrees.

4. The flight control system of claim 2, wherein determining whether the coarse resolution position coordinate and the fine resolution position coordinate of the received position coordinates correspond with each other comprises independently determining whether a coarse resolution latitude of the latitude coordinate corresponds with a fine resolution latitude of the latitude coordinate and whether a coarse resolution longitude coordinate corresponds with a fine resolution longitude coordinate of the longitude coordinate.

5. The flight control system of claim 2, wherein the executable program further includes instructions for:

determining a difference between the received position coordinate and a reference coordinate to form a delta latitude coordinate and a delta longitude coordinate; and
performing a coordinate transformation on the delta latitude coordinate and the delta longitude coordinate to produce a delta x coordinate representing a distance in an x direction and a delta y coordinate representing a distance in a y direction perpendicular to the x direction.

6. The flight control system of claim 1, wherein the executable program further includes instructions for discarding the presently received position coordinate when the calculated difference is greater than the threshold, discarding comprising using the previously received position coordinate in place of the presently received position coordinate.

7. The flight control system of claim 1, wherein the position sensor comprises at least one global positioning system (GPS) receiver.

8. The flight control system of claim 1, wherein asynchronously receiving the position coordinates comprises asynchronously receiving the position coordinates via an ARINC-429 bus.

9. The flight control system of claim 1, wherein the executable program further includes instructions for producing a correction data signal according to the received position coordinate and a reference coordinate.

10. A rotorcraft comprising:
a body;
a power train coupled to the body and comprising a power source and a drive shaft coupled to the power source;
a main rotor system coupled to the power train and comprising a plurality of main rotor blades;
a GPS receiver system configured sense a physical position and produce position coordinates based on the sensed physical position, wherein each position coordinate comprises
a latitude coordinate split into a coarse resolution latitude coordinate comprising the most significant bits of the latitude coordinate and a fine resolution latitude coordinate comprising the least significant bits of the latitude coordinate, and
a longitude coordinate split into a coarse resolution longitude coordinate comprising the most significant bits of the longitude coordinate and a fine resolution longitude coordinate comprising the least significant bits of the longitude coordinate;
a flight control system operable to change at least one operating condition of the main rotor system;
a pilot control assembly configured to receive commands from a pilot, wherein the flight control system is a fly-by-wire flight control system in electrical communication with the pilot control assembly; and
a flight control computer in electrical communication between the flight control system, the GPS receiver system, and the pilot control assembly, the flight control computer configured to
asynchronously receive the position coordinates from the GPS receiver system via a bus,
determine whether the coarse resolution latitude coordinate corresponds with the fine resolution latitude coordinate by comparing a difference between the latitude coordinate and a previously received latitude coordinate to a first threshold, and
determine whether the coarse resolution longitude coordinate corresponds with the fine resolution longitude coordinate by comparing a difference between the longitude coordinate and a previously received longitude coordinate to a second threshold, wherein the first threshold and the second threshold are based on a velocity of the rotorcraft.

11. The rotorcraft of claim 10, wherein the first threshold and the second threshold is $3.5 \times 10^{-5}$ degrees.

12. The rotorcraft of claim 10, wherein:
the bus comprises an ARINC-429 bus; and
the coarse resolution latitude coordinate, the fine resolution latitude coordinate, the coarse resolution longitude coordinate, and the fine resolution longitude coordinate each comprise 19 bits.

13. The rotorcraft of claim 10, wherein:
the flight control computer is configured to utilize the latitude coordinate when the difference between the latitude coordinate and the previously received latitude coordinate is within the first threshold and to discard the latitude coordinate when the difference between the latitude coordinate and the previously received latitude coordinate is not within the first threshold; and
the flight control computer is configured to utilize the longitude coordinate when the difference between the longitude coordinate and the previously received longitude coordinate is within the second threshold and to discard the longitude coordinate when the difference between the longitude coordinate and the previously received longitude coordinate is not within the second threshold.

14. The rotorcraft of claim 10, wherein the flight control computer is further configured to produce a correction data signal according to the received position coordinates and a reference coordinate.

15. The rotorcraft of claim 14, wherein the flight control computer is configured to produce the correction data signal by
determining a difference between the received position coordinate and the reference coordinate to form a delta latitude coordinate and a delta longitude coordinate; and
performing a coordinate transformation on the delta latitude coordinate and the delta longitude coordinate to produce a delta x coordinate representing a distance in an x direction and a delta y coordinate representing a distance in a y direction perpendicular to the x direction.

16. A method of operating a rotorcraft, the method comprising:
asynchronously receiving position coordinates of a rotorcraft from a position sensor, each received position coordinate comprising a coarse resolution position coordinate and a fine resolution position coordinate; and
determining whether the coarse resolution position coordinates and the fine resolution position coordinate of the received position coordinates correspond with each other, determining comprising calculating a difference between a presently received position coordinate and a previously received position coordinate, and comparing the calculated difference to a threshold, wherein the threshold is based on a velocity of the rotorcraft.

17. The method of claim 16, wherein each position coordinate comprises a latitude coordinate and a longitude coordinate.

18. The method of claim 17, wherein the threshold is $3.5 \times 10^{-5}$ degrees.

19. The method of claim 17, wherein determining whether the coarse resolution position coordinate and the fine resolution position coordinate of the received position coordinates correspond with each other comprises independently determining whether a coarse resolution latitude of the latitude coordinate corresponds with a fine resolution latitude of the latitude coordinate and whether a coarse resolution longitude coordinate corresponds with a fine resolution longitude coordinate of the longitude coordinate.

20. The method of claim 17, further comprising:
determining a difference between the received position coordinate and a reference coordinate to form a delta latitude coordinate and a delta longitude coordinate; and
performing a coordinate transformation on the delta latitude coordinate and the delta longitude coordinate to produce a delta x coordinate representing a distance in an x direction and a delta y coordinate representing a distance in a y direction perpendicular to the x direction.

21. The method of claim 16, further comprising discarding the presently received position coordinate when the calculated difference is greater than the threshold, discarding comprising using the previously received position coordinate in place of the presently received position coordinate.

22. The method of claim 16, further comprising producing a correction data signal according to the received position coordinate and a reference coordinate.

\* \* \* \* \*